Figure 1:
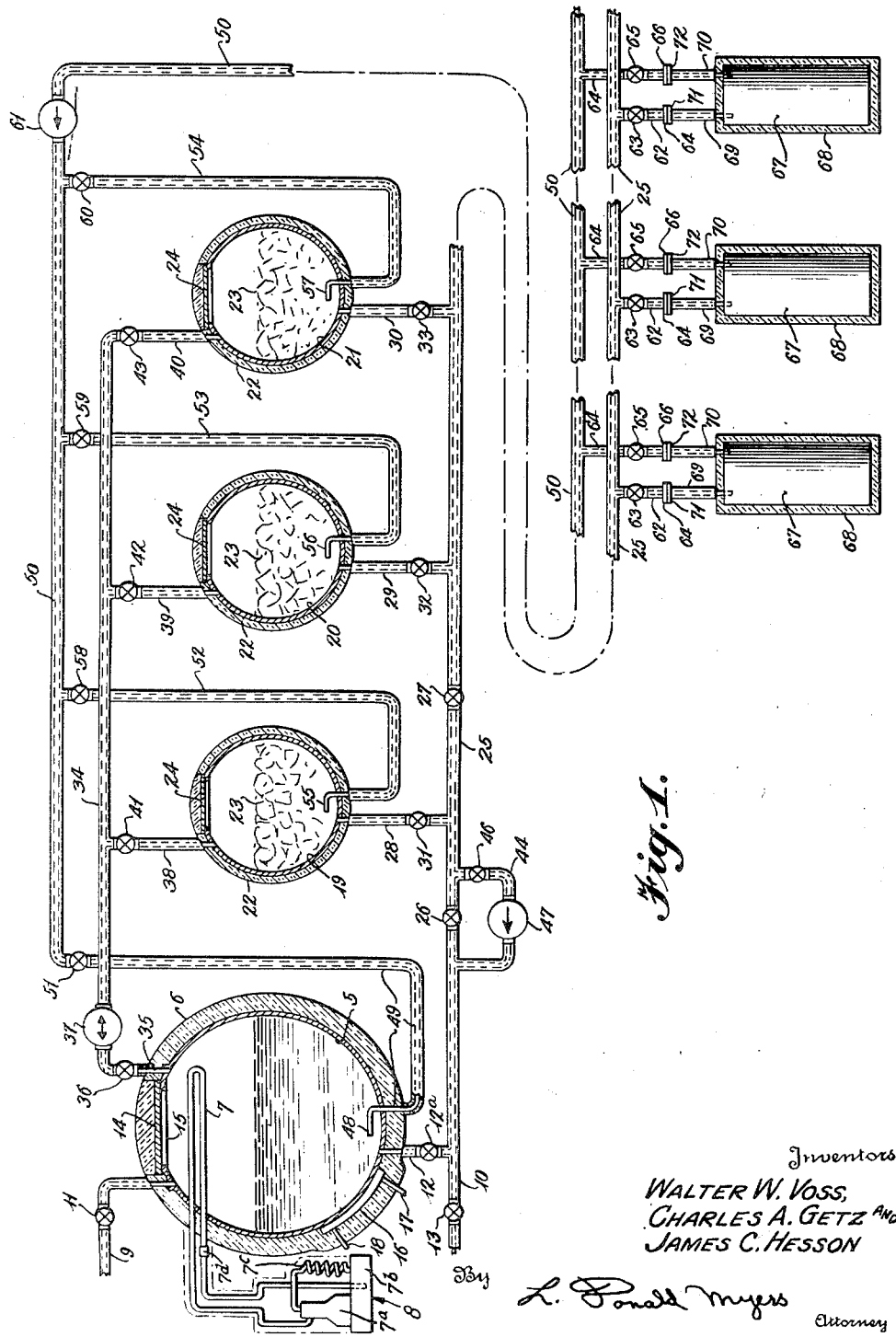

Jan. 31, 1950  W. W. VOSS ET AL  2,496,185
METHOD AND APPARATUS FOR CHARGING
VESSELS WITH SOLID CARBON DIOXIDE

Filed Nov. 7, 1946  2 Sheets-Sheet 1

Inventors
WALTER W. VOSS,
CHARLES A. GETZ AND
JAMES C. HESSON

By L. Ronald Myers
Attorney

Jan. 31, 1950   W. W. VOSS ET AL   2,496,185
METHOD AND APPARATUS FOR CHARGING
VESSELS WITH SOLID CARBON DIOXIDE
Filed Nov. 7, 1946   2 Sheets-Sheet 2

Inventors
WALTER W. VOSS,
CHARLES A. GETZ AND
JAMES C. HESSON

By L. Donald Myers
Attorney

Patented Jan. 31, 1950

2,496,185

UNITED STATES PATENT OFFICE 2,496,185

METHOD AND APPARATUS FOR CHARGING VESSELS WITH SOLID CARBON DIOXIDE

Walter W. Voss, Chicago, Charles A. Getz, Glen Ellyn, and James C. Hesson, Chicago, Ill., assignors to Cardox Corporation, Chicago, Ill., a corporation of Illinois Application November 7, 1946, Serial No. 708,376

21 Claims. (Cl. 62—1)

This invention relates to new and useful improvements in methods and apparatus for charging vessels with solid carbon dioxide, and deals more specifically with the problem of charging such vessels while they are connected in and form a fixed part of solid carbon dioxide refrigerating systems for transportation vehicles, such as trucks, trailers, and railway cars.

The refrigeration of railway cars by the circulation through a duct system of carbon dioxide vapor obtained as a result of sublimation of solid carbon dioxide stored in insulated vessels is disclosed and claimed in the application of Hilding V. Williamson, Serial No. 615,946, filed September 13, 1945. As set out further in this application, the storage vessels are provided with openings, normally closed by removable cover plates, through which blocks of solid carbon dioxide are charged when the system of the car is to be supplied with its refrigerant. This method of charging the storage vessels possesses the following disadvantages:

(a) Each storage vessel must be provided with a charging opening that is large enough to allow for the passage of the conventional one cubic foot blocks of solid carbon dioxide. Since the vessels are positioned on cars that are moved long distances; are subjected to various kinds of uncontrollable operating conditions; and may be serviced by a different crew almost every time they are supplied with new charges of solid carbon dioxide, it is extremely difficult to maintain tight seals for the removable covers.

(b) If very special care is not exercised in the handling of the solid carbon dioxide blocks, foreign matter, such as pieces of the paper in which the blocks are wrapped, sticks, dirt, and an excessive amount of moisture, will be charged into the vessels with the blocks. If this foreign matter is not removed at relatively frequent intervals, it will accumulate until the efficiency of the storage vessels and their associated refrigerating system will be drastically impaired. To properly clean out such storage vessels, it is necessary to disconnect and remove them from their car for servicing at properly equipped stations. Such a procedure adds materially to the maintenance costs of this type of refrigeration system.

(c) Because the vessels can only be charged with solid carbon dioxide in the form of blocks, or the like, the vessels cannot be charged at locations where only carbon dioxide in liquid form is available.

(d) Facilities, such as slides, troughs, walkways, conveyors, and the like, for handling the blocks of solid carbon dioxide and charging them into the storage vessels of the railway cars must be provided along extensive lengths of trackage at charging stations if several railway cars are to be serviced simultaneously.

It is the primary object of this invention to provide new and improved methods and apparatus for charging storage vessels of railway car or truck refrigerating systems with solid carbon dioxide without necessitating opening of the vessels to the atmosphere by the removal of covers from charging openings, thereby eliminating the problem of maintaining tight seals for such openings.

Another primary object of the invention is to provide methods and apparatus for supplying storage vessels of refrigerating systems with charges of solid carbon dioxide in such a manner that the likelihood of delivering foreign matter to the vessels is eliminated.

A still further important object of the invention is the provision of means for simultaneously charging the storage vessels of refrigerating systems for a plurality of railway cars by merely installing two insulated pipe lines, which extend from the charging plant, along the trackage on which the cars are spotted for receiving their charges of solid carbon dioxide refrigerant.

Still another object of the invention is the provision of methods and apparatus for charging refrigerating system storage vessels with solid carbon dioxide at all locations where adequate carbon dioxide is available in either liquid or solid form.

A further object of the invention is the provision of methods and apparatus for quickly charging with solid carbon dioxide, either one or several at a time, the storage vessels of all of the refrigerated railway cars or trucks that are brought to a charging station during a working shift and, through the medium of a high capacity refrigerant which may be produced and/or stored during non-working or off-shift periods, quickly solidifying the liquid carbon dioxide delivered to the vessels.

Another object of the invention is the provision of a plant for charging the storage vessels of refrigerating systems for railway cars, or the like, with solid carbon dioxide, said charging plant being permanently installed at a fixed station so that the railway cars to be serviced may be brought to the plant, or said plant being mounted on one or more railway cars so that it may be moved over the tracks to the cars to be serviced.

A still further important object of the invention is to provide novel methods of supplying the storage vessel charging plant with its required amount of carbon dioxide at locations where either liquid or solid, or both liquid and solid, carbon dioxide are available.

Other objects and advantages of the invention will be apparent during the course of the following description.

Figure 2:
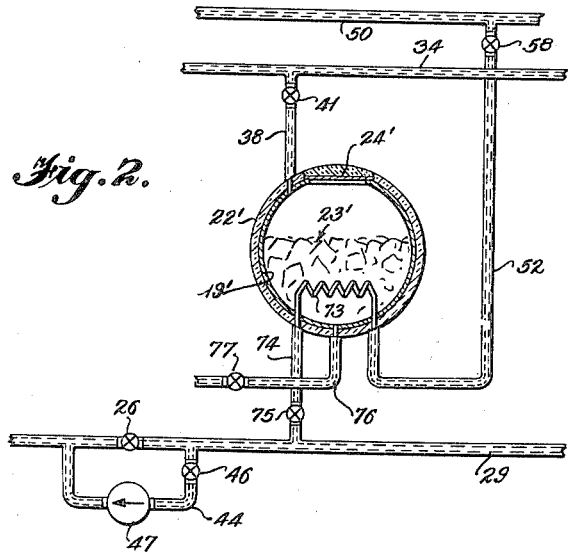
Figure 3:
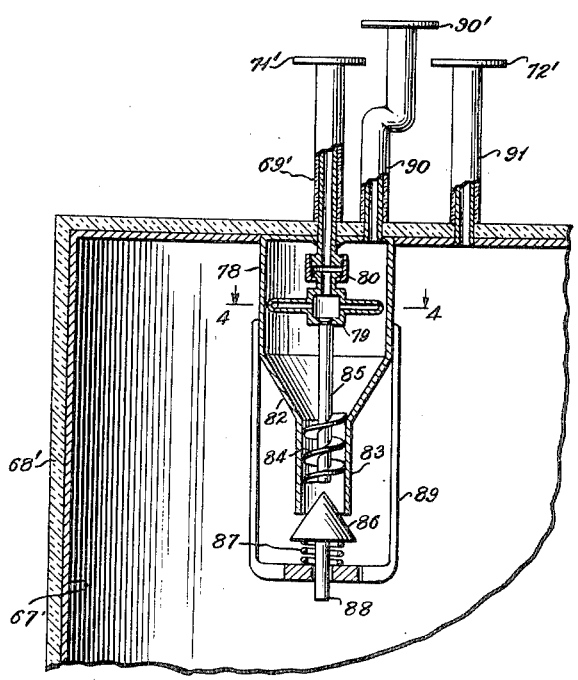
Figure 4:
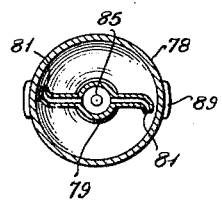

In the accompanying drawings forming a part of this specification and in which like numerals are employed to designate like parts throughout the same, Figure 1 is an elevational view, partly in vertical section, of a plant for charging storage vessels with solid carbon dioxide, Figure 2 is an elevational view, partly in vertical section, of a portion of a charging plant, but illustrating a modification of the plant shown in Fig. 1, Figure 3 is a fragmentary, enlarged, vertical section of a modified form of storage vessel to be charged with solid carbon dioxide, and Figure 4 is a sectional view taken on line 4—4 of Fig. 3.

In the drawings, wherein for the purpose of illustration are shown the preferred embodiments of this invention, and first particularly referring to Fig. 1, the reference character 5 designates a tank for receiving a supply of carbon dioxide. The tank is suitably insulated at 6 to retard the absorption of heat through the wall of the tank. The tank 5 normally is intended to confine a supply of liquid carbon dioxide which is maintained at a desired, substantially constant, sub-ambient temperature, and its corresponding vapor pressure, by means of the evaporator coil 7, that is arranged in the vapor space of the tank, which forms a part of the refrigerator system 8. This system further includes the compressor 7a, the receiver 7b, the condenser coil 7c and the expansion valve 7d.

The tank 5 may be charged either with liquid carbon dioxide or solid carbon dioxide in blocks. When the tank is charged with liquid carbon dioxide, a delivery tank truck or railway car is connected to the supply tank 5 by means of the two pipe lines 9 and 10. The pipe line 9 is employed for connecting the vapor space of the tank 5 with the vapor space of the tank of the transportation vehicle. A shut-off valve 11 is provided in the pipe line 9. The pipe line 10 is connected to the liquid space of the supply tank 5 by means of the branch line 12. The pipe line 10 is intended to be connected at its outer end to the tank of the transportation vehicle. The valve 13 is provided in the pipe line 10 for controlling flow of liquid carbon dioxide therethrough. After the vapor pressure in the supply tank 5 and in the tank of the transportation vehicle has been equalized through the vapor pipe line 9, the liquid carbon dioxide can be pumped from the tank of the transportation vehicle to the supply tank 5. Any desired type of liquid level gauge; for example, see the patent to H. V. Williamson, No. 2,361,440, issued October 31, 1944, may be employed for determining the amount of liquid carbon dioxide in tank 5.

If liquid carbon dioxide is not available to supply the tank 5 at any given location, the tank 5 can be charged with blocks or chunks of solid carbon dioxide by removing the insulated cover 14 to expose the charging opening 15. The removable cover 14, of course, should be sealed in any suitable manner and fastened in place so as to resist the vapor pressure prevailing in the supply tank 5.

After the tank has been charged with solid carbon dioxide, the charge can be converted to liquid by passing steam, hot water, or any other higher temperatured fluid through the chamber 16 that is placed in heat exchange relation with the wall of the supply tank 5. If desired, an electric heating element may be employed in place of the fluid chamber 16. Circulating pipes 17 and 18 are provided for the chamber 16.

It has been stated above that the liquid carbon dioxide confined in the supply tank 5 should be maintained at any desired, constant, sub-ambient temperature. It is preferred that the temperature be maintained at least as low as 0° F., with its corresponding vapor pressure of about 305 lbs. per square inch, gauge. For certain operations, a temperature of —20° F., with its corresponding vapor pressure of 200 lbs. per square inch, gauge, is preferred.

The storage vessel charging plant of Fig. 1 further includes a desired number of pressure containers 19, 20, and 21 which are enclosed in suitable insulation 22. These pressure containers are intended to be provided with charges or masses of solid carbon dioxide, designated by the reference character 23, when the plant is operated to charge storage vessels. Each one of the containers 19 to 21, inclusive, is provided with an insulated, removable cover 24 for permitting blocks or chunks of solid carbon dioxide to be placed therein.

If solid carbon dioxide is not available for filling the containers 19 to 21, inclusive, solid carbon dioxide charges may be produced in the containers in the following way.

A carbon dioxide liquid manifold 25 is connected to the liquid space of the supply tank 5 through the medium of the branch line 12. This manifold 25 has located therein the two flow control valves 26 and 27. The branch lines 28, 29, and 30 are respectively connected to the containers 19, 20, and 21. These three branch lines, also, are connected to the liquid carbon dioxide manifold 25. Flow control valves 31, 32, and 33 are located in the branch lines 28, 29, and 30, respectively. By opening the valve 12a, in the branch line 12, the valves 26 and 27, in the manifold 25, and the valves 31, 32, and 33, in the branch lines 28, 29, and 30, respectively, the liquid space of the supply tank 5 will be placed in communication with the bottom portions of the three containers 19 to 21, inclusive. If desired, only one or two of the containers may be placed in communication with the liquid space of the supply tank 5 by manipulation of the proper ones of the valves just referred to.

A carbon dioxide withdrawal line 34 is connected to the vapor space of the supply tank 5 through the branch line 35 that is provided with a control valve 36. The line 34 is provided with a vapor pump 37 that can be operated to effect flow of vapor in either direction through line 34. The vapor line 34 is connected to the vapor spaces of the three containers 19, 20, and 21 by the branch lines 38, 39, and 40, respectively. These branch lines are provided with the flow control valves 41, 42, and 43, respectively.

To provide the three pressure containers 19, 20, and 21 with charges of solid carbon dioxide by employing liquid carbon dioxide from the supply tank 5, the bottom portions of the three containers are placed in communication with the liquid space of the tank 5 in the manner previously described. In filling the three containers with liquid carbon dioxide in this manner, the valves 36 and 41 to 43, inclusive, should be opened. Liquid carbon dioxide then will flow by gravity from the supply tank 5 into the three containers. Liquid level gauges of the type referred to for tank 5 may be employed with containers 19, 20 and 21. If desired, pump 37 may be operated to effect transfer of the vapor to increase the charging rate for the three containers. After the three containers are properly charged with liquid carbon dioxide, the valves 12a, 26, 27, 31, 32, and 33 should be closed and the vapor pump 37, if not operating already, should be started to effect the transfer of vapor from the three containers 19 to 21, inclusive, to the vapor space of the tank 5. Transfer of vapor is continued until the pressure in each one of the containers 19 to 21, inclusive, is reduced to at least 60 lbs. per square inch, gauge. When this pressure is reached, the liquid carbon dioxide remaining in the three containers is converted to solid carbon dioxide. It is preferred that the pump 37 continue to operate until the pressure in each one of the containers 19 to 21, inclusive, is reduced to atmospheric. At this pressure, the solid carbon dioxide in the three containers has a temperature of −110° F.

During certain operations of the apparatus so far described, it is desirable to be able to transfer liquid carbon dioxide from any one or more of the containers 19 to 21, inclusive, to the liquid space of the supply tank 5. For that reason, a by-pass line 44 is provided and is connected at its opposite ends to the liquid manifold 25. A flow control valve 46 is connected in the line 44 on the inlet side of the liquid pump 47 that is connected in the line 44. This pump is designed to effect flow of liquid carbon dioxide in the direction of the arrow-line applied to the pump. The valve 46 is kept closed until the pump 47 is to be operated to effect transfer of liquid carbon dioxide. When the pump 47 is to be operated, the valve 46 is opened and the valve 26 is closed.

The liquid space of the supply tank 5 has extending therein the bent-over end 48 of the branch line 49 that is connected to the carbon dioxide vapor manifold 50. A flow control valve 51 is provided in the branch line 49 adjacent its connection with the manifold 50.

The carbon dioxide vapor manifold 50, also, has connected thereto the three branch lines 52, 53, and 54 which extend into the lower portions of the three containers 19, 20, and 21, respectively. The inner ends 55, 56, and 57 of the branch lines 52, 53, and 54, respectively, are bent-over within their respective containers. Flow control valves 58, 59, and 60 are provided in the branch lines 52, 53, and 54, respectively, for controlling communication between these branch lines and the carbon dioxide vapor manifold 50.

The bent-over end portions 48 and 55 to 57, inclusive, are intended to be perforated with a plurality of small openings so that carbon dioxide vapor can be delivered in a plurality of jets or streams in the tank 5 and the containers 19 to 21, inclusive. Carbon dioxide vapor that is delivered to the supply tank 5 through the perforated end 48 will bubble up through the low temperatured body of liquid carbon dioxide confined in this tank and will be condensed. Carbon dioxide vapor that is delivered to the bottom portion of each one of the containers 19 to 21, inclusive, through the bent-over ends 55 to 57, inclusive, will be condensed as it flows upwardly through the mass of solid carbon dioxide 23 into which it is discharged.

The liquid carbon dioxide manifold 25 is intended to extend for any desired distance along trackage on which railway refrigerator cars are spotted for having their storage vessels charged with solid carbon dioxide. The carbon dioxide vapor manifold 50, also, is extended along the same trackage in parallelism with the liquid manifold 25. The vapor manifold 50 is provided with a pump 61 which is intended to operate to effect transfer of carbon dioxide vapor in the direction of the arrow-line applied thereto.

Any desired number of branch lines 62 are connected to the carbon dioxide liquid manifold 25 at intervals that are spaced from each other to accommodate, or correspond with, the standard length of railway refrigerator cars. That is to say, the branch lines 62 are spaced along the manifold 25 so that one or two of the branch lines may be employed for each railway car. If the refrigerator systems of the railway cars are provided with one storage vessel per car, the branches 62 are spaced so that each one will be associated with a separate railway car. If the refrigerator systems of the railway cars are each provided with two solid carbon dioxide storage vessels, the branch lines 62 are arranged in pairs so that two of such lines will be associated with each railway car. Each branch line 62 is provided with a flow control valve 63 and a coupling plate or flange 64.

The carbon dioxide vapor manifold 50 is provided with branch lines 64 that are equal in number to the branch lines 62 for the manifold 25 and are spaced in the same manner as the branch lines 62. A valve 65 is provided for each branch line 64 and a coupling plate or flange 66 is fastened to the extremity of each branch line 64.

The storage vessels of the railway refrigerator cars, which are to be charged with solid carbon dioxide, are designated by the reference characters 67. Each one of these vessels is insulated at 68 and is provided with two pipe connections 69 and 70. The pipe connections 69 are provided with coupling plates or flanges 71 while the pipe connections 70 are provided with coupling plates or flanges 72. Fig. 1 discloses the storage vessels 67 connected to the branch lines 62 and 64 by means of their pipe connections 69 and 70 and the associated coupling members 64—71 and 66—72. The storage vessel charging plant disclosed in Fig. 1 can be installed in a permanent manner at a suitable location or station with the tank 5, and containers 19 to 21, inclusive, suitably housed in a building, or other enclosure, while the outer portions of the two manifolds 25 and 50 are permanently installed along a desired length of trackage. With the plant set up in this manner, it is necessary for the railway refrigerator cars to be brought to the plant when they are to receive charges of solid carbon dioxide refrigerant in their storage vessels. At some charging locations, it may prove to be difficult or undesirable to locate the plant at any fixed or permanent place along a siding where the railway refrigerator cars can be brought for receiving their charges of solid carbon dioxide. In such instances, the charging plant can be installed on one or more railway cars that are coupled as a train to a suitable railway yard or terminal engine. With the charging plant installed on the cars of a service train, the plant can be moved to the refrigerator cars to be charged. Of course, when the plant is mounted on the cars of a service train, the portions of the two manifolds 25 and 50, which are to be coupled to the storage vessels 67 of the refrigerated railway cars, should be of a flexible character so that they can be laid out along the tracks on which the refrigerator cars are spotted. After the charging plant has been employed for refilling the storage vessels at one location, the flexible portions of the two manifolds 25 and 50 should be returned to one of the cars of the service train so that they can be transported to a new location for charging additional cars.

It will be noted by inspecting Fig. 1 that all of the pipe lines, branch lines, and manifolds are suitably insulated to reduce as much as possible the absorption of heat from the surrounding atmosphere by the liquid or vaporous carbon dioxide flowing therethrough.

Assuming that the charging plant of Fig. 1 has been conditioned, during a non-working or off-shift period; i. e., has its supply tank 5 charged with a desired quantity of liquid carbon dioxide and the three containers 19 to 21, inclusive, charged with desired masses of solid carbon dioxide, the plant will be in condition for use during working periods for charging the pressure vessels of refrigerated railway cars, or the like, with proper amounts of solid carbon dioxide. The plant is very flexible in operation and can be employed, or manipulated, in several different ways for charging either a plurality of storage vessels simultaneously or individually.

The capacities of the supply tank 5 and the containers 19 to 21, inclusive, should be adequate to charge all of the storage vessels of refrigerating systems that should be serviced during a normal working day or period. However, if the plant is taxed beyond its normal capacity during certain rush periods, it is possible to refill certain elements of the plant to take care of such abnormal periods.

Considering first that the plant is to be used to charge the maximum number of storage vessels simultaneously, when the storage vessels to be charged are properly coupled to the manifold branch lines 62 and 64, all of the valves of the system should be closed. After the storage vessels have been properly connected to the system, valves 12a, 26, 27, 51, 58, 59, 60, 63 and 65 are opened. The opening of these valves will permit liquid carbon dioxide to flow, under its own vapor pressure, from the supply tank 5 into all of the storage vessels 67 simultaneously. If desired, pump 61 may be operated to speed up transfer.

After the storage vessels have been substantially filled with liquid carbon dioxide, the valves 12a, 26, 27, and 63 are closed and the valves 51, 58, 59, 60, and 65 are left opened. If it is not already operating, the pump 61 is started. The pump will withdraw carbon dioxide vapor from all of the storage vessels 67. This withdrawn vapor will be delivered to the discharge end portions 48, 55, 56, and 57 of the tank 5 and containers 19, 20, and 21, respectively.

The carbon dioxide vapor that is delivered to the discharge end portion 48 of the branch line 49 will be caused to bubble up through the cold liquid carbon dioxide confined in the supply tank 5. The carbon dioxide vapor will be condensed as a result of this passage through the body of cold carbon dioxide.

The carbon dioxide vapor that is discharged from the ends 55, 56, and 57 of the branch lines 52, 53, and 54, respectively, will be condensed as a result of passing upwardly through the very cold masses of solid carbon dioxide 23 that are confined in said containers.

The withdrawal of vapor from the storage vessels 67 continues until a pressure ranging from atmospheric to say 10 lbs. per square inch, gauge, prevails in the vessels. When the pressure is reduced to 60 lbs. per square inch, gauge, in the storage vessels, the remaining liquid carbon dioxide will be converted to solid carbon dioxide in the form of snow. The continued exhausting of the storage vessels 67, to reduce the pressure therein to atmospheric, will lower the temperature of solid carbon dioxide that is formed in the vessels to $-110°$ F. If the liquid carbon dioxide in the supply tank 5 has been maintained at $-20°$ F., and its corresponding vapor pressure of 200 lbs. per square inch, gauge, the removal of 48 percent of the liquid charged into each storage vessel 67 will leave the remaining 52 percent as solid carbon dioxide at the $-110°$ F.

At this point, pump 61 is stopped and valves 51, 58, 59, 60, and 65 are closed. The storage vessels 67, of the several railway cars being serviced, are then disconnected from the two manifolds 25 and 50 by disconnecting the couplings represented by the cooperating flanges 64—71 and 66—72. The refrigerated railway cars then should be removed to make room for the spotting of additional railway cars in the charging region served by the manifolds 25 and 50. Of course, if the charging plant is mounted on the railway cars of a service train, the recharged refrigerator cars may remain at the location at which they were refilled and the service train may be moved to a new location for charging the storage vessels of other railway cars.

It will be appreciated from the above description of the mode of operation of the charging plant in filling the first batch of storage vessels 67 that liquid carbon dioxide is now available in each one of the three containers 19, 20, and 21. When a second batch of storage vessels 67 is to be charged, desired ones or all of the valves 31, 32, and 33 can be opened along with valves 12a, 26, 27, and 63 for delivering liquid carbon dioxide to the new batch of storage vessels 67.

From the above description of the operation of the charging plant in which the tank 5 and all three of the containers 19 to 21, inclusive, are employed, it will be appreciated that fractional portions of the charging plant can be employed separately for charging smaller numbers of storage vessels 67 with solid carbon dioxide. To illustrate these modes of operation of the charging plant, the following descriptions will be given for separately charging individual storage vessels 67. It should be understood, however, that these modes of operation are not limited to the charging of only one storage vessel, but can be employed for charging any small number of vessels, such as two or three.

We will first consider the operation of charging one storage vessel 67 by using only the liquid supply tank 5. It is understood at the start of this operation that all of the valves of the systems are closed.

Valves 12a, 26, 27, 51, and the valves 63 and 65 for the storage vessel to be charged are open. Liquid carbon dioxide then will flow by gravity from the tank 5 into the storage vessel being charged. If desired, pump 61 may be operated to secure more rapid transfer. After this vessel has received the proper amount of liquid carbon dioxide, the four valves 12a, 26, 27 and 63 are closed.

The pump 61 will be started, if it is not operating already, and it will withdraw carbon dioxide vapor from the single storage vessel until the pressure in this vessel reaches a value of from atmospheric to about 10 lbs. per square inch, gauge, when the pump 61 is stopped. The withdrawn carbon dioxide vapor will be delivered to the liquid space of tank 5 through the vapor discharge end 48 of branch 49. This discharged carbon dioxide vapor will be condensed as it bubbles up through the cold liquid carbon dioxide.

Another mode of charging one or a small number of storage vessels 67 consists of utilizing the supply tank 5 and any one of the solid carbon dioxide containers 19, 20, or 21. It will be considered that container 19 is used with the supply tank 5.

After the small number of storage vessels have been properly coupled to the two manifolds 25 and 50, valves 12a, 26, 27, 51, 58 and the proper valves 63 and 65 are opened. Liquid carbon dioxide then will flow from tank 5 into the storage vessels being charged, as described above. After the vessels 67 have received their proper amounts of liquid carbon dioxide, the valves 12a, 26, 27, and 63 are closed.

Carbon dioxide vapor is continued to be withdrawn from the storage vessel or vessels that have been filled with liquid. If only one vessel has been filled with liquid, the withdrawn vapor can be condensed in the container 19. If two or three storage vessels have been filled with liquid, it may be desirable to utilize both the container 19 and the supply tank 5 for condensing the withdrawn vapor.

Assuming that only one storage vessel has been filled with liquid carbon dioxide, valve 51 is closed and valve 58, of branch line 52, and valve 65, associated with the filled storage vessel, are left open and pump 61 is either started or continued operating. The pressure vessel being serviced is exhausted of its carbon dioxide vapor, in the manner previously described, and the withdrawn vapor is delivered to the mass of solid carbon dioxide 23 confined in container 19. This carbon dioxide vapor will be condensed as it passes up through the mass of solid carbon dioxide.

It was pointed out above that the supply tank 5 could be charged with solid carbon dioxide instead of liquid carbon dioxide. The solid carbon dioxide then is to be converted to liquid by means of the heater 16. It is not necessary to wait until all of the carbon dioxide placed in tank 5 is liquefied before a small number of storage vessels can be charged with solid carbon dioxide by using only the supply tank 5. This mode of operation will be described as follows:

After a sufficient amount of solid carbon dioxide, that has been placed in tank 5, is liquefied, this liquid can be used for filling one or two storage vessels 67, by manipulation of the proper valves for connecting the liquid and vapor spaces of tank 5 with the storage vessel. After the storage vessel has been filled with liquid carbon dioxide, the liquid flow control valves are closed. Valve 51, of the branch line 49, and valve 65, of the storage vessel being charged, are left open and pump 61 is either started or continued operating. The carbon dioxide vapor that is withdrawn from the storage vessel 67 is delivered to the interior of tank 5 and flows upwardly through the remaining solid carbon dioxide for being condensed. After the storage vessel 67 has been exhausted to the desired pressure, the last mentioned valves are closed and pump 61 is stopped.

Another mode of operation for charging one or two storage vessels at a time would be to utilize only two of the containers, for example, containers 20 and 21. Let us assume that container 20 has been charged with solid carbon dioxide sufficiently in advance of the time for starting the charging of the first storage vessel during a working shift for some of the solid carbon dioxide in container 20 to have liquefied as a result of the absorption of heat from the surrounding atmosphere through the wall of this container. This liquid carbon dioxide can be delivered to the storage vessel 67 being charged by opening the valve 32 of branch line 29, valve 59 of branch line 53, and valves 63 and 65 of the storage vessel. After the vessel has been substantially filled with liquid carbon dioxide from container 20, valves 32 and 63 are closed. Valve 59, of branch line 53, and valve 65, of the vessel 67, are left open and pump 61 is either started or left operating for the withdrawal of vapor from the vessel. This vapor is released into the remaining mass of solid carbon dioxide in container 20 for being condensed by contact with the solid carbon dioxide. This procedure can be continued until all of the solid carbon dioxide originally charged into container 20 has been used up and nothing but a residual charge of carbon dioxide vapor remains in container 20.

In the meantime, container 21 has been charged with solid carbon dioxide and is to be used, in the same manner as container 20 was used, for charging additional storage vessels 67. While container 21 is being used, it may be necessary to recharge container 20 with solid carbon dioxide. However, before cover 24 of container 20 is removed for refilling this container with solid carbon dioxide, some disposition should be made of the residual carbon dioxide vapor that remains in container 20. This vapor can be transferred to container 21 in the following manner.

A storage vessel 67 should be connected to the two manifolds 25 and 50. This container is to be used at this point for the sole purpose of interconnecting the two branch lines 62 and 64 of the two manifolds. Valve 32, of branch line 29, the valves 63 and 65, associated with the connected storage vessel, and valve 60, of branch line 54, then should be opened and pump 61 should be started. Operation of this pump will withdraw the residual vapor from container 20, through branch line 29, manifold 25, branch line 62, pipe line 69, storage vessel 67, pipe line 70, branch line 64, manifold 50, and branch line 54, and deliver it to the bottom of container 21 for being condensed by contact with the solid carbon dioxide in container 21. After container 20 has been exhausted to atmospheric pressure, valve 32 is closed and valve 33 then is opened so that liquid carbon dioxide will be delivered from container 21 to the storage vessel 67 being charged for substantially filling this vessel with liquid carbon dioxide.

After the vessel has been filled with liquid, its valve 63 is closed. The connections thus established will permit the pump 61 to exhaust the connected vessel 67 to the desired pressure and will deliver the withdrawn vapor to the mass of solid carbon dioxide in container 21. Additional storage vessels can be charged from container 21 until its supply of solid carbon dioxide is exhausted when the operation may be returned to container 20.

If it is not desired to transfer the residual charges of carbon dioxide vapor left in containers 20 and 21 to the other of these two containers, respectively, the residual vapor can be disposed of in any other desired manner, such as by delivering it to the vapor space of supply tank 5 by the proper operation of pump 37 and the proper manipulation of valves 36, 42, and 43.

With the two containers 20 and 21 operating in the above described manner as a storage vessel charging unit, these two containers can be mounted on a railway car and transported to refrigerator car storage vessel charging points remotely located from the remainder of the charging plant which includes the supply tank 5 and the container 19. Of course, couplings should be provided in manifolds 25 and 50 and pipe line 34 for disconnecting containers 20 and 21 from the remainder of the charging plant to permit containers 20 and 21 to be employed as a separately operable charging unit.

Fig. 2 discloses a modification which involves a relatively simple structural change for one of the containers 19, 20, or 21. The specific illustration provided by Fig. 2 makes the modification in container 19. The container of Fig. 2, therefore, will be given the same reference characters as those applied to container 19 of Fig. 1 plus a prime ('). The various pipes, etc., that are common to the disclosures of Figs. 1 and 2 will be given the same reference characters in Fig. 2 so that the disclosure of Fig. 2 can be readily applied to the system of Fig. 1.

The purpose of the modification of Fig. 2 is to permit container 19' to be filled with solid carbon dioxide 23' that is contaminated in such a way that it is not desirable to deliver any of it, in the form of liquid carbon dioxide, to storage vessels 67 and yet it is desirable to utilize the contaminated solid carbon dioxide to condense vapor that is withdrawn from storage vessels 67. To bring about this change, branch line 52, extending from the carbon dioxide vapor manifold 50 is connected at its end to a condensing coil 73 that is located in the lower, or solid carbon dioxide, space of container 19'. The remaining end of this coil 73 is connected to a branch line 74 that leads to the liquid carbon dioxide manifold 25. A valve 75 is connected in the branch line 74 for controlling flow through the latter.

When container 19' is employed for condensing carbon dioxide vapor withdrawn from a storage vessel 67, the pump 61, of the system of Fig. 1, will cause the withdrawn vapor to flow through branch line 52, condenser coil 73, and branch line 74 into the liquid manifold 25. By closing valve 26 and opening valve 46, pump 47 can be employed for forcing the condensed carbon dioxide, obtained from coil 73, to supply tank 5.

After all of the solid carbon dioxide 23' of container 19' has been liquefied, as a result of heat exchange with the carbon dioxide flowing through coil 73, container 19' can be emptied of its liquid carbon dioxide through the drain pipe 76 that is controlled by the valve 77.

Figs. 3 and 4 disclose a modification for the storage vessels 67. Consequently, the reference character 67' will be applied to the vessel of Fig. 3 and the insulation for this vessel will be given the reference character 68'. This modification comprises means for charging the storage vessel 67' with compressed carbon dioxide snow instead of first filling the vessel with liquid carbon dioxide and then exhausting it to the desired pressure.

To accomplish this change in the mode of operation, the pipe line 69' is connected to one of the branch lines 62 of the manifold 25 by means of the coupling plate or flange 71'. Liquid carbon dioxide then can be delivered to the expansion chamber 78 that is associated with the storage vessel 67'. This liquid carbon dioxide will flow through the pipe line 69' into the center chamber of the reaction motor 79. A swivel coupling 80 is employed for connecting the reaction motor 79 to the pipe 69'. This reactor motor is provided with discharge orifices or jets 81, see Fig. 4, so that discharge of liquid carbon dioxide through these jets will cause the motor 79 to spin. The discharged liquid carbon dioxide will be permitted to suddenly expand in chamber 78 and its sudden drop in pressure will convert the liquid carbon dioxide to a mixture of snow and vapor which is formed in chamber 78.

The expansion chamber 78 is tapered at 82 and then is formed into a tubular throat at 83. Positioned within the bore of throat 83 is a feed screw 84 that is connected to the reaction motor 79 by the shaft 85. Operation of the reaction motor, resulting from the discharge of carbon dioxide through the tips or nozzles 81, therefore, effects rotation of the feed screw 84 for feeding or forcing the carbon dioxide snow portion of the mixture formed in chamber 78 through the bore of the tubular extension 83.

The lower end of the extension 83 is intended to be closed normally by the conical valve or stopper 86 that is yieldably held against the end of the extension 83 by the spring 87. The stem 88 of the valve or stopper 86 and the spring 87 are supported by the skeleton frame 89 depending from the main body portion of the expansion chamber 78 to which it is attached. Because of the resistance offered by the spring-loaded valve or stopper 86 to the discharge of carbon dioxide snow from the lower end of the tubular extension 83, the snow that is forced through the tubular extension end and past the depressed valve or stopper 86 is compressed. This compressed carbon dioxide snow is deposited in the interior of the storage vessel 67' until the desired amount of solid carbon dioxide has been placed in the vessel. The amount of solid carbon dioxide placed in the vessel 67' can be determined within satisfactory limits either by measuring with a flow meter the amount of liquid carbon dioxide delivered to pipe line 69', or by timing the delivery with the rate of flow of liquid carbon dioxide being known.

The vapor portion of the mixture that is formed in the expansion chamber 78, which is near the "triple point," or about 60 lbs. per square inch, gauge, is exhausted through the pipe 90. This pipe is flanged at 90' for connection with a pump or compressor, not shown, for handling the vapor at this pressure. The pipe 91 functions to exhaust the carbon dioxide vapor that is formed in the storage vessel 67', at about atmospheric pressure, as a result of sublimation of the solid carbon dioxide that is delivered to the vessel. The upper end of the pipe 91 is provided with a coupling plate or flange 72' by means of which it can be connected to the coupling plate or flange 66 of branch line 64 in the system of Fig. 1.

The advantages obtained as a result of employing this carbon dioxide snow forming, compressing, and delivering mechanism in connection with a storage vessel is that the vessel 67' need not be constructed to withstand any more than about 15 lbs. per square inch, gauge, whereas the storage vessels 67, of Fig. 1, must be constructed to withstand two or three hundred pounds per square inch pressure, gauge and about 94 percent of the carbon dioxide vapor that is formed is recovered from chamber 78 at a pressure of about 60 lbs. per square inch, gauge.

It is to be understood that we do not desire to be limited to the exact order of method steps as they have been disclosed, for variations and modifications of the same, which fall within the scope of the accompanying claims are contemplated. It further is to be understood that the particular types of apparatus herein shown and described are to be taken as preferred examples of the invention, and that various changes in the shape, size, and arrangement of parts may be resorted to without departing from the spirit of the invention or the scope of the subjoined claims.

Having thus described the invention, we claim:

1. The method of charging a plurality of storage vessels with solid carbon dioxide, comprising maintaining a source of supply of liquid carbon dioxide in confinement at a substantially constant sub-ambient temperature and its corresponding vapor pressure, providing a plurality of separate confined masses of solid carbon dioxide, transferring liquid carbon dioxide from said source of supply to only a fractional number of the plurality of storage vessels which are to be charged to fill each of said fractional number of vessels with liquid carbon dioxide, withdrawing carbon dioxide vapor from the filled storage vessels until the pressure therein drops to atmospheric at which time the remaining carbon dioxide has solidified, delivering the withdrawn carbon dioxide vapor to one or more of the places of confinement of the masses of solid carbon dioxide to liquefy said vapor, transferring the liquid carbon dioxide produced in said places of confinement of the masses of solid carbon dioxide along with liquid carbon dioxide from said source of supply to a second fractional number of the storage vessels to be charged to fill each vessel of said second fraction with liquid, withdrawing carbon dioxide vapor from said second fraction of vessels and liquefying the withdrawn vapor in one or more of the places of confinement of the masses of solid carbon dioxide and repeating the aforesaid steps with additional fractional numbers of storage vessels until all of the plurality of vessels have been charged.

2. The method of charging a plurality of storage vessels with solid carbon dioxide, comprising maintaining a source of supply of liquid carbon dioxide in confinement at a substantially constant sub-ambient temperature and its corresponding vapor pressure, providing a plurality of separate confined masses of solid carbon dioxide, transferring liquid carbon dioxide from said source of supply to only a fractional number of the plurality of storage vessels which are to be charged to fill each of said fractional number of vessels with liquid carbon dioxide, withdrawing carbon dioxide vapor from the filled vessels until the pressure therein drops to atmospheric at which time the remaining carbon dioxide has solidified, delivering a portion of the withdrawn carbon dioxide vapor to the bottom portion of the body of liquid carbon dioxide in said source of supply so that the vapor will liquefy in bubbling up through the cold liquid, delivering the remaining withdrawn carbon dioxide vapor to one or more of the places of confinement of the masses of solid carbon dioxide to liquefy the said vapor, transferring the liquid carbon dioxide produced in said places of confinement along with liquid carbon dioxide from said source of supply to a second fractional number of the storage vessels to be charged to fill each vessel of said second fraction with liquid carbon dioxide, withdrawing carbon dioxide vapor from said second fraction of vessels and liquefying the withdrawn vapor in the source of supply of liquid carbon dioxide and in the places of confinement of the solid carbon dioxide and repeating the aforesaid steps with additional fractional numbers of storage vessels until all of the plurality of storage vessels have been charged.

3. The method of charging a storage vessel with solid carbon dioxide, comprising maintaining a source of supply of liquid carbon dioxide in confinement at a substantially constant sub-ambient temperature and its corresponding vapor pressure, providing a confined mass of solid carbon dioxide, transferring liquid carbon dioxide from said source of supply to a storage vessel to be charged to fill said vessel with liquid, withdrawing carbon dioxide vapor from the storage vessel until the pressure therein drops to atmospheric at which time the remaining carbon dioxide has solidified, and liquefying the withdrawn carbon dioxide vapor by delivering it to the place of confinement of the mass of solid carbon dioxide so as to contact the latter.

4. The method of charging a storage vessel with solid carbon dioxide, comprising maintaining a source of supply of liquid carbon dioxide in confinement at a substantially constant sub-ambient temperature and its corresponding vapor pressure, filling said storage vessel with liquid carbon dioxide from said source of supply, withdrawing carbon dioxide vapor from said storage vessel until the pressure therein drops to atmospheric at which time the remaining carbon dioxide has solidified, and delivering the withdrawn vapor to the bottom portion of the body of liquid carbon dioxide in said source of supply so that the vapor will liquefy in bubbling up through the cold liquid.

5. The method of charging a plurality of storage vessels with solid carbon dioxide, comprising maintaining a source of supply of liquid carbon dioxide in confinement at a substantially constant sub-ambient temperature and its corresponding vapor pressure, providing a confined mass of solid carbon dioxide, transferring liquid carbon dioxide from said source of supply to only a fractional number of the plurality of storage vessels which are to be charged to fill each of said fractional number of vessels with liquid carbon dioxide, withdrawing carbon dioxide vapor from the filled vessels until the pressure therein drops to atmospheric at which time the remaining carbon dioxide has solidified, delivering a portion of the withdrawn carbon dioxide vapor to the bottom portion of the body of liquid carbon dioxide in said source of supply so that the vapor will liquefy in bubbling up through the cold liquid, delivering the remaining withdrawn vapor to the place of confinement of the mass of solid carbon dioxide to liquefy the vapor, filling the remainder of said plurality of storage vessels with liquid carbon dioxide from the place of confinement of the solid carbon dioxide and from said source of supply, and withdrawing carbon dioxide vapor from said remainder of the vessels and liquefying the withdrawn vapor by delivering it to the source of supply of liquid carbon dioxide and to the place of confinement of the solid carbon dioxide.

6. The method of charging a plurality of relatively small vessels with solid carbon dioxide, comprising placing a supply of solid carbon dioxide in a relatively large pressure container sufficiently in advance of the time the charging of the small storage vessels is to start to permit some of the solid carbon dioxide to be changed to liquid by the absorption of heat through the wall of the pressure container, transferring liquid carbon dioxide from the pressure container to the first of the small vessels to be charged until said vessel is filled with liquid, withdrawing carbon dioxide vapor from the filled vessel until the pressure therein has dropped to atmospheric at which time the carbon dioxide remaining in the vessel will have solidified, delivering the withdrawn vapor to the pressure container to be liquefied by the solid carbon dioxide therein, filling the second small vessel with liquid carbon dioxide from the pressure container, withdrawing vapor from the second small vessel and liquefying this vapor in the pressure container, and continuing the above procedure until all of the small vessels have been charged.

7. The method of charging a plurality of relatively small vessels with solid carbon dioxide, comprising placing in two pressure containers, having a combined storage capacity that is at least equal to the combined capacity of the small vessels to be charged, a supply of solid carbon dioxide, after a desired amount of the solid carbon dioxide placed in one of the pressure containers has been liquefied by the absorption of heat through the wall of the container transferring liquid carbon dioxide from that container to the first of the small vessels to be charged until said vessel is filled with liquid, withdrawing carbon dioxide vapor from the filled vessel until the pressure therein has dropped to atmospheric at which time the carbon dioxide remaining in the vessel will have solidified, delivering the withdrawn vapor to the said one pressure container to be liquefied by the solid carbon dioxide therein, continuing the aforesaid steps of charging small vessels with solid carbon dioxide from the said one pressure container until nothing but a residual charge of carbon dioxide vapor remains in said container, transferring said residual vapor to the second of said pressure containers to be liquefied by contact with the solid carbon dioxide therein and to reduce the pressure in said one pressure container to atmospheric so that it can be opened to receive another supply of solid carbon dioxide, and continuing the aforesaid steps of charging small vessels with solid carbon dioxide obtained from said second pressure container.

8. The method of charging a plurality of relatively small vessels with solid carbon dioxide, comprising placing a supply of solid carbon dioxide in a relatively large pressure container, establishing two fluid flow paths between said container and the first of the small vessels to be charged, after a desired amount of the solid carbon dioxide in the pressure container has been liquefied by the absorption of heat through the wall of the container producing a charge of solid carbon dioxide in the connected small vessel and producing additional liquid carbon dioxide in the pressure container by charging liquid carbon dioxide from the container into the vessel through one of the fluid flow paths until the vessel is substantially filled, charging carbon dioxide vapor into the container from the vessel through the other fluid flow path until the carbon dioxide remaining the the vessel has solidified, and passing the vapor charged into the container over the solid carbon dioxide remaining in the latter to liquefy said vapor; and repeating the aforesaid solid and liquid carbon dioxide producing steps with additional vessels connected to the container until the supply of carbon dioxide in the container is exhausted.

9. The method of charging a storage vessel with solid carbon dioxide, comprising maintaining a source of supply of liquid carbon dioxide in confinement at a substantially constant sub-ambient temperature and its corresponding vapor pressure, providing a confined mass of solid carbon dioxide, transferring liquid carbon dioxide from said source of supply to a storage vessel to be charged to substantially fill said vessel with liquid, withdrawing carbon dioxide vapor from the storage vessel until the pressure therein drops to atmospheric and the remaining carbon dioxide has solidified, passing the withdrawn vapor in heat exchange relation to the confined mass of solid carbon dioxide to condense the vapor, and delivering the condensed carbon dioxide to the liquid source of supply.

10. The method of charging a plurality of small storage vessels with solid carbon dioxide, comprising maintaining a source of supply of liquid carbon dioxide in confinement at a substantially constant sub-ambient temperature and its corresponding vapor pressure, providing a confined mass of solid carbon dioxide, transferring liquid carbon dioxide from said source of supply to a storage vessel to be charged to substantially fill said vessel with liquid, withdrawing carbon dioxide vapor from the filled storage vessel until the pressure therein drops to atmospheric and the remaining carbon dioxide has solidified, passing the withdrawn vapor in heat exchange relation to the confined mass of solid carbon dioxide to condense said vapor, delivering the condensed carbon dioxide to the liquid source of supply, and repeating the above mentioned steps for charging additional storage vessels.

11. The method of charging a storage vessel with solid carbon dioxide, comprising maintaining a source of supply of liquid carbon dioxide in confinement at a substantially constant sub-ambient temperature and its corresponding vapor pressure, providing a confined mass of solid carbon dioxide, transferring liquid carbon dioxide from said source of supply to an expansion zone in which the liquid is permitted to suddenly expand to form a mixture of snow and vapor, compressing the snow portion of the mixture and delivering the resultant solid carbon dioxide to the storage vessel to be charged, withdrawing the vapor portion of the mixture from the expansion zone and any vapor that is formed in the storage vessel as a result of sublimation of the solid carbon dioxide charged therein, and liquefying the withdrawn vapor by delivering it to the place of confinement of the mass of solid carbon dioxide so as to contact the latter.

12. Apparatus of the type described, comprising an insulated tank for confining a supply of liquid carbon dioxide, means for maintaining liquid carbon dioxide in said tank at a substantially constant sub-ambient temperature and its corresponding vapor pressure, a plurality of insulated containers each of which is adapted to receive a mass of solid carbon dioxide, a liquid carbon dioxide supply manifold having a multiplicity of valve controlled branch lines connected thereto, certain of said branch lines being connected to the bottom of each of said insulated containers and to said insulated tank, coupling means on each one of the remaining branch lines for connecting them to storage vessels to be charged with liquid carbon dioxide obtained from any one or more of the containers or the tank, a carbon dioxide vapor manifold having a multiplicity of valve controlled branch lines connected thereto, certain of said last mentioned branch lines being connected one to the bottom of each of said insulated containers and said insulated tank, coupling means on each one of the remaining branch lines for connecting them to the aforesaid storage vessels, and a pump in said carbon dioxide vapor manifold for withdrawing vapor from the storage vessels being charged and delivering it to any one or more of the containers or tank for being condensed therein.

13. Apparatus of the type described, comprising an insulated tank for confining a supply of liquid carbon dioxide, means for maintaining liquid carbon dioxide in said tank at a substantially constant sub-ambient temperature and its corresponding vapor pressure, a plurality of insulated containers each of which is adapted to receive a mass of solid carbon dioxide, a plurality of storage vessels to be charged with solid carbon dioxide, means for delivering liquid carbon dioxide to the storage vessels from said supply tank, means for withdrawing carbon dioxide vapor from the storage vessels until the pressure in the vessels drops to atmospheric and the remaining carbon dioxide has solidified, and means for delivering the withdrawn vapor to selected ones of the containers and tank for being condensed therein.

14. Apparatus of the type described, comprising an insulated tank for confining a supply of liquid carbon dioxide, means for maintaining liquid carbon dioxide in said tank at a substantially constant sub-ambient temperature and its corresponding vapor pressure, a plurality of insulated containers each of which is adapted to have therein a mass of solid and some liquid carbon dioxide, a plurality of storage vessels to be charged with solid carbon dioxide, means for delivering liquid carbon dioxide to the storage vessels from said supply tank and said containers, means for withdrawing carbon dioxide vapor from the storage vessels until the pressure in the vessels drops to atmospheric and the remaining carbon dioxide has solidified, and means for delivering the withdrawn vapor to selected ones of the containers and tank for being condensed therein.

15. Apparatus of the type described, comprising an insulated tank for confining a supply of liquid carbon dioxide, means for maintaining liquid carbon dioxide in said tank at a substantially constant sub-ambient temperature and its corresponding vapor pressure, a plurality of insulated containers, means for delivering liquid carbon dioxide to said containers from said tank, means for withdrawing carbon dioxide vapor from the containers to effect solidification of the remainder and for delivering the vapor to the tank to be condensed therein, a plurality of storage vessels to be charged with solid carbon dioxide, means for delivering liquid carbon dioxide to the storage vessels from said supply tank, means for withdrawing carbon dioxide vapor from the storage vessels until the pressure therein drops to atmospheric and the remaining carbon dioxide has solidified, and means for delivering the vapor withdrawn from the vessels to the containers for being condensed by contact with the solid carbon dioxide therein.

16. Apparatus of the type described, comprising an insulated tank for confining a supply of liquid carbon dioxide, means for maintaining liquid carbon dioxide in said tank at a substantially constant sub-ambient temperature and its corresponding vapor pressure, a plurality of insulated containers each of which is adapted to receive a mass of solid carbon dioxide, a liquid carbon dioxide supply manifold having a multiplicity of valve controlled branch lines connected thereto, certain of said branch lines being connected to the bottom of each of said insulated containers and to said insulated tank, coupling means on each one of the remaining branch lines for connecting them to storage vessels to be charged with liquid carbon dioxide obtained from any one or more of the containers or the tank, a carbon dioxide vapor manifold having a multiplicity of valve controlled branch lines connected thereto, certain of said last mentioned branch lines being connected one to the bottom of each of said insulated containers and said insulated tank, coupling means on each one of the remaining branch lines for connecting them to the aforesaid storage vessels, a pump in said carbon dioxide vapor manifold for withdrawing vapor from the storage vessels being charged and delivering it to any one or more of the containers or tank for being condensed therein, and means for delivering the condensed carbon dioxide from the containers to the supply tank.

17. Apparatus of the type described, comprising an insulated tank for confining a supply of liquid carbon dioxide, means for maintaining liquid carbon dioxide in said tank at a substantially constant sub-ambient temperature and its corresponding vapor pressure, a plurality of insulated containers each of which is adapted to receive a mass of solid carbon dioxide, a plurality of storage vessels to be charged with solid carbon dioxide, means for delivering liquid carbon dioxide to the storage vessels from said supply tank, means for withdrawing carbon dioxide vapor from the storage vessels until the pressure in the vessels drops to atmospheric and the remaining carbon dioxide has solidified, means for delivering the withdrawn vapor to selected ones of the containers and tank for being condensed therein, and means for delivering the condensed carbon dioxide from the containers to the supply tank.

18. Apparatus of the type described, comprising an insulated tank for confining a supply of liquid carbon dioxide, means for maintaining liquid carbon dioxide in said tank at a substantially constant sub-ambient temperature and its corresponding vapor pressure, an insulated container adapted to receive a mass of solid carbon dioxide, a storage vessel to be charged with solid carbon dioxide, means for delivering liquid carbon dioxide to the storage vessel from said tank, means for withdrawing carbon dioxide vapor from the storage vessel until the pressure therein has dropped to atmospheric and the remaining carbon dioxide has solidified and means for passing the withdrawn vapor in heat exchange relation to but out of direct contact with the solid carbon dioxide in the container to condense the vapor and for delivering the condensed carbon dioxide to the supply tank.

19. Apparatus of the type described, comprising an insulated tank for confining a supply of liquid carbon dioxide, means for maintaining liquid carbon dioxide in said tank at a substantially constant sub-ambient temperature and its corresponding vapor pressure, an insulated container adapted to receive a mass of solid carbon dioxide, a storage vessel to be charged with solid carbon dioxide, means forming an expansion chamber, means for delivering liquid carbon dioxide from said tank to the expansion chamber in which it is permitted to suddenly expand to convert it to a mixture of snow and vapor, means for compressing the snow portion of said mixture and delivering it to the storage vessel, means for withdrawing the vapor portion of said mixture from the expansion chamber and any vapor that is formed in the storage vessel as a result of sublimation of the solid carbon dioxide charged therein, and means for delivering the withdrawn vapor to the insulated container to be condensed by contact with the solid carbon dioxide therein.

20. Apparatus of the type described, comprising an insulated tank for confining a supply of liquid carbon dioxide, means for maintaining liquid carbon dioxide in said tank at a substantially constant sub-ambient temperature and its corresponding vapor pressure, an insulated container adapted to receive a mass of solid carbon dioxide, a storage vessel to be charged with solid carbon dioxide, means forming an expansion chamber, means for delivering liquid carbon dioxide from said tank to the expansion chamber in which it is permitted to suddenly expand to convert it to a mixture of snow and vapor, means for compressing the snow portion of said mixture and delivering it to the storage vessel, means for withdrawing the vapor portion of said mixture from the expansion chamber and any vapor that is formed in the storage vessel as a result of sublimation of the solid carbon dioxide charged therein, means for delivering the withdrawn vapor to the insulated container to be condensed by contact with the solid carbon dioxide therein, and means for delivering the carbon dioxide condensed in the container to the tank for use in filling additional storage vessels.

21. Apparatus of the type described, comprising a plurality of storage vessels to be charged with solid carbon dioxide, means for delivering liquid carbon dioxide to only a fractional number of the plurality of storage vessels which are to be charged to substantially fill each one of the latter, means for withdrawing vapor from said filled vessels to effect solidification of the liquid carbon dioxide remaining therein, means for condensing the withdrawn vapor by contacting it with solid carbon dioxide, and means for delivering the condensed carbon dioxide to the remainder of said plurality of storage vessels for solidification by the withdrawal of vapor as aforesaid.

WALTER W. VOSS.
CHARLES A. GETZ.
JAMES C. HESSON.

REFERENCES CITED

The following references are of record in the file of this patent:

UNITED STATES PATENTS

| Number | Name | Date |
|---|---|---|
| 1,546,681 | Slate | July 21, 1925 |
| 1,727,865 | Dehottay | Sept. 10, 1929 |
| 1,869,346 | Comer | July 26, 1932 |
| 1,895,886 | Lockwood | Jan. 31, 1933 |
| 2,341,697 | Dennis | Feb. 15, 1944 |
| 2,341,698 | Dennis | Feb. 15, 1944 |